Sept. 1, 1931. S. CACCAMO 1,821,420
ILLUMINATOR FOR LICENSE PLATES
Filed Oct. 20, 1930 2 Sheets-Sheet 1
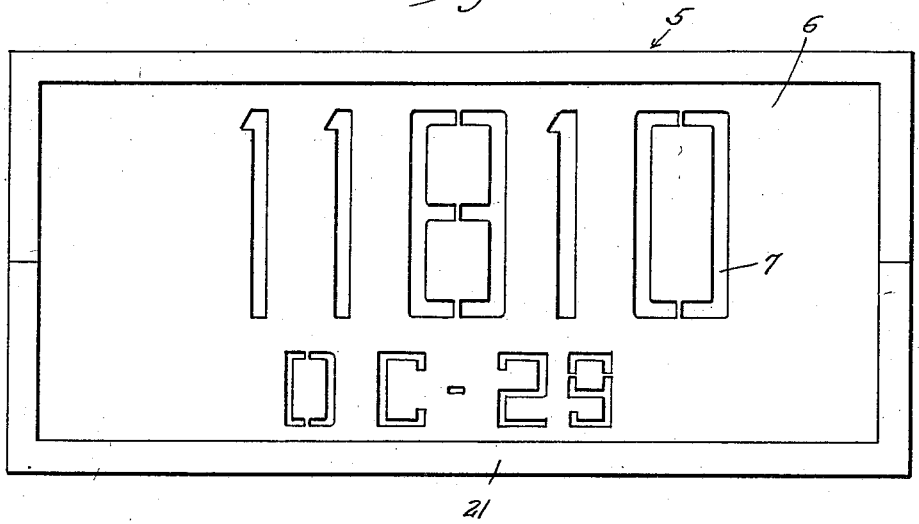
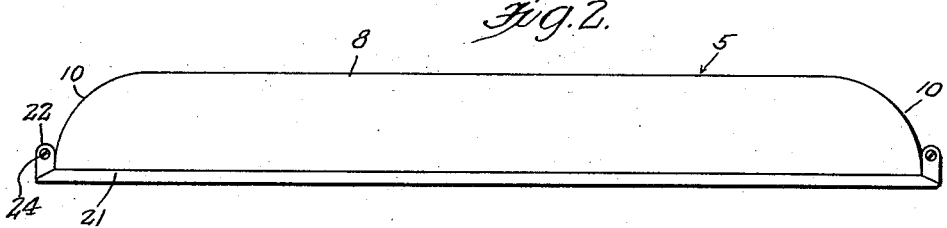
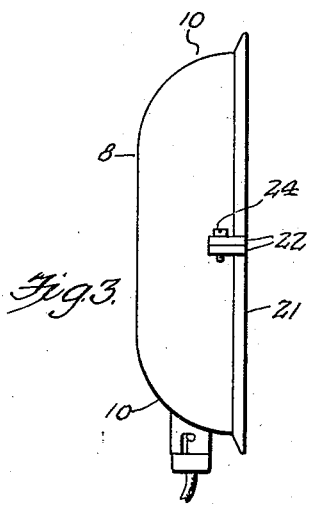
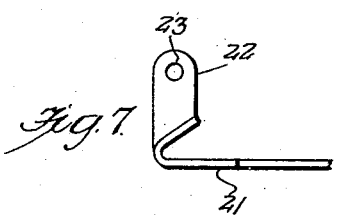
Inventor
Samuel Caccamo,
By Clarence A. O'Brien
Attorney Sept. 1, 1931.  S. CACCAMO  1,821,420
ILLUMINATOR FOR LICENSE PLATES
Filed Oct. 20, 1930    2 Sheets-Sheet 2
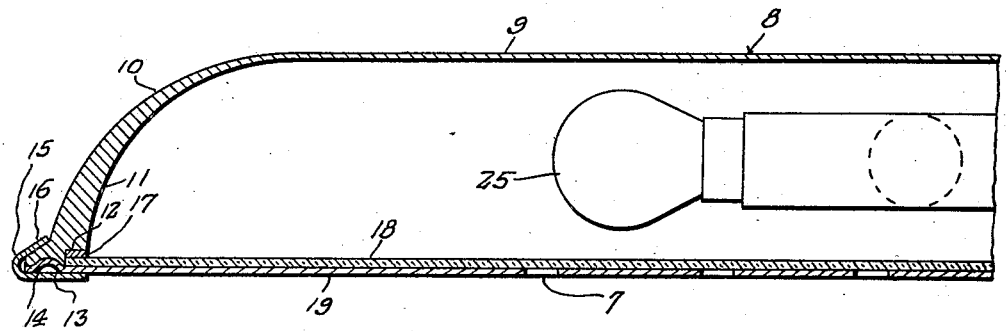
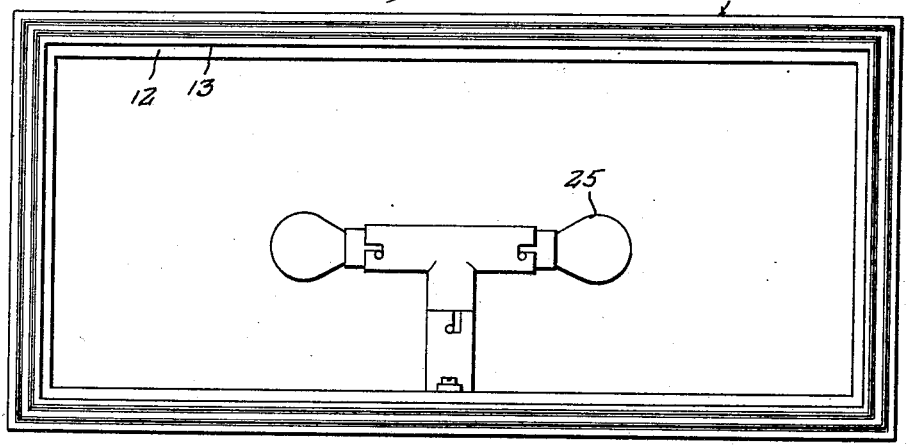
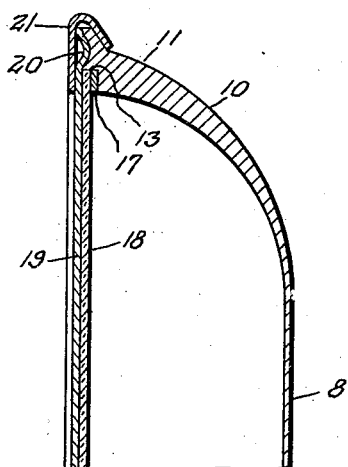
Inventor
Samuel Caccamo,
By Clarence A. O'Brien
Attorney Patented Sept. 1, 1931

1,821,420

UNITED STATES PATENT OFFICE

SAMUEL CACCAMO, OF SAN JOSE, CALIFORNIA

ILLUMINATOR FOR LICENSE PLATES

Application filed October 20, 1930. Serial No. 489,989.

This invention relates generally to electrically illuminated signs and signals, and particularly to an illuminator for license plate, for automobiles and like vehicles, though the application of the device is not necessarily confined to mounting upon automobiles and similar vehicles, but may be also employed on boats, or wherever it is required to plainly display at night or dark places, information of the general kind disclosed by the license plate.

It is an object of this invention to provide a device of this kind which possesses new and novel features which render it convenient and attractive, easily installed, and which is cheap and simple and easy to manufacture, and has other advantages and purposes, which will be more fully understood as this specification proceeds.

These and other objects, the nature of the invention, its composition and arrangement and combination of parts will be readily understood by any one acquainted with the art to which this invention relates upon consulting the following description and drawings in which:—

Figure 1 is a front elevational view of my improved illuminator for license plates.

Fig. 2 is a top view of Fig. 1.

Fig. 3 is an end view thereof.

Fig. 4 is a longitudinal section through the illuminator.

Fig. 5 is a view of the front of Fig. 1 with the license plate removed to disclose the interior arrangement.

Fig. 6 is a vertical transverse section through my improved illuminator in detail, and the disposition and arrangement of parts constituting the same.

Fig. 7 is a detail view of the construction of the lugs formed on the exterior members of the illuminator.

It is to be definitely understood that I do not desire to limit the application of this invention to the particular modification set up herein to illustrate the principles thereof, and any change or changes may be made in material or structure and rearrangement of parts consistent with the spirit and scope of the invention.

Referring in detail to the drawings, it will be observed that the numeral 5 generally designates the illuminator, the numeral 6 refers to the perforated or stencilled license plate, having the cutaway numerals 7, which may be formed to serve the same purpose, that is permitting the passage of the light, in any suitable manner. The license plate may be of metal, or of any suitable substance, such as non-transparent glass, fibre, or similar material, as my invention is not limited to the character of the material used. The only requirement is that the light coming from the source of illumination, within the illuminator will be capable of throwing the numerals into such relief or distinction from the body of the license plate, as to be readily discernible at night, or in dark places, and under other conditions.

The illuminator consists of an elongated housing 8 providing a rectangular front opening 9 of the size of the license plate. It will be observed by referring to Figs. 2, 3, and 6, that the casing 8 is formed of a rear wall 10 of straight uniform construction, and the side walls are gradually curved and gradually thickened as at 11, and the thickened portion of the side walls is presented to the front side of the casing. The said casing may be formed or constructed of any suitable material, a preferable form being illustrated and constructed of metal and cast in suitable dimensions.

Referring to the cross sectional views of the drawings, it will be observed that a rabbet 12 is cut in the inward disposed forward edge portion of the side walls of the casing and the said rabbet forms a seat and shoulder 13 which runs completely about the said edge of the casing. It will be observed in the sectional views of the drawings that outward from the said shoulder and formed in the said edge of the casing, is formed a depression 14, which extends completely about the said edge of the casing and parallel with the said shoulder 13.

A projection 15 is formed to project forward of the edge of the casing and outwardly, and has a backwardly slanting portion 16 which merges into the thickened portion of the side walls of the casing.

As seen in Figs. 4 and 6, a resilient packing 17 is disposed to rest upon the seat 12 and to run completely about the rabbet. Closing the forward opening of the casing 8 is a sheet of translucent or transparent material 18, whose edges are formed to register in the said slot 12 upon the packing material 17 and against the shoulder 13, the said material 18 and the packing 17 being of such thickness, that the one superposed on the other, comes to a thickness approximately equal to the depth of the shoulder 13. A license plate having the perforations, or transparencies 7, and having its edges waved as at 20 to conform with the shape and contour of the channel 14, is disposed tightly against the translucent or transparent member 18. To hold the license plate 19 against the translucent member 18, and to maintain these together, and against the packing 17, and the three in proper association with the casing 8, there is provided a channelled frame 21 which is made in equal halves.

At the terminal of each side of each half there is provided a lug 22 having a screw threaded hole 23 for receiving a bolt 24, for bringing the lugs together, to clamp the member 21 upon the casing. The channel member 21 has the cross section as shown in Fig. 4, of U-shaped formation having one leg of the U somewhat longer than the other, to extend from its middle portion to be arranged against the portion 16 rearwardly of the edge of the casing 8.

The long leg of the member 21 is disposed across the forward edge of the casing 8 or rather across, but spaced from said edge, and including behind it and the license plate edge, the edges of the translucent member 18. The short leg is disposed to contact the portion 16 and projection 15 and to engage in this way for retaining the edges of the license plate and the translucent member behind it, and properly position them in the opening of the casing 8.

It is obvious from the drawings that it would not be a departure from the invention to specify that the lower half of the member 21 be formed stationary with or secured to the casing 8, or that the engageable halves may be made completely removable. Thus the channel members 21 are lifted downwardly and upwardly respectively and the license plate and the translucent member 18 held in the forward opening of the casing 8, and the two halves fastened together by the screws 24.

Within the casing 8 there is formed a structure for a pair of electric bulbs 25. It is obvious from Fig. 5 that the forward face of the member 21 can be given any suitable or ornamental character or design, and the illustration shows particularly the rabbet, forming the seat for the packing material 17, and the shoulder and depression or channel 14 running completely around the forward edge of the casing.

It is believed that the foregoing description clearly discloses the nature of the invention and it is thought obvious that it will be clearly understood by what means the objects of the invention have been accomplished.

Having thus described my invention, what I claim as new is:—

A license plate illuminator of the class described comprising a narrow elongated casing having rounded side walls merging into a rectangular portion defining a rectangular opening extending the greatest length and width of the casing, and provided interiorly with electric lighting means, a translucent sheet closing said opening, and a license plate having a corrugation formed just within its edges, the license plate disposed against the sheet and having its corrugations disposed beyond all sides of the sheet and seated in a groove in the rectangular porton, and a channelled frame for gripping the outer edge of said rectangular portion and the edge portion of the license plate, for clamping the same in position on the casing, said license plate being provided with indicia responsive to the said lighting means, said frame provided with means to removably clamp the same in position on the casing.

In testimony whereof I affix my signature.

SAMUEL CACCAMO.